United States Patent
Sekiya (10) Patent No.: US 9,096,254 B2
(45) Date of Patent: Aug. 4, 2015

(54) VEHICLE STEERING CONTROL APPARATUS

(75) Inventor: Yoshihide Sekiya, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/372,076

(22) PCT Filed: Jan. 31, 2012

(86) PCT No.: PCT/JP2012/000593
§ 371 (c)(1),
(2), (4) Date: Jul. 14, 2014

(87) PCT Pub. No.: WO2013/114429
PCT Pub. Date: Aug. 8, 2013

(65) Prior Publication Data
US 2015/0006033 A1    Jan. 1, 2015

(51) Int. Cl.
*B62D 5/04* (2006.01)
*B62D 5/00* (2006.01)

(52) U.S. Cl.
CPC ............... *B62D 5/043* (2013.01); *B62D 5/001* (2013.01); *B62D 5/003* (2013.01)

(58) Field of Classification Search
CPC ......... B62D 5/003; B62D 5/043; B62D 5/001
USPC ....................................................... 701/41
See application file for complete search history.

(56) References Cited

U.S. PATENT DOCUMENTS

| 2006/0011405 A1 | 1/2006 | Bayer et al. |
| 2007/0215405 A1 | 9/2007 | Tsutsumi et al. |
| 2009/0247362 A1* | 10/2009 | Nedachi et al. ............... 477/172 |

FOREIGN PATENT DOCUMENTS

| JP | A-2005-059772 | 3/2005 |
| JP | A-2005-526661 | 9/2005 |
| JP | A-2006-082685 | 3/2006 |
| JP | A-2006-335209 | 12/2006 |
| JP | A-2007-131184 | 5/2007 |
| JP | A-2007-230472 | 9/2007 |
| JP | A-2010-188930 | 9/2010 |
| JP | A-2010-202096 | 9/2010 |

* cited by examiner

*Primary Examiner* — Mary Cheung
*Assistant Examiner* — Anne Mazzara
(74) *Attorney, Agent, or Firm* — Oliff PLC (57) ABSTRACT

A steering control apparatus of a vehicle includes a steering unit having an input shaft, a turning unit having an output shaft, a clutch for connecting or disconnecting between the input shaft and the output shaft, and a control unit for controlling the turning unit based on an output from the steering unit. The control unit controls the rotation of the output shaft such that when the input shaft rotates, the clutch is caused to run idle. The clutch may be configured such that the clutch runs idle when the rotating speed of the output shaft is greater than or equal to the rotating speed of the input shaft and such that the clutch is connected when the rotating speed of the output shaft is less than that of the input shaft.

13 Claims, 3 Drawing Sheets

VEHICLE STEERING CONTROL APPARATUS

TECHNICAL FIELD

The present invention relates to a steering control apparatus of a vehicle.

BACKGROUND TECHNOLOGY

For example, Patent Document 1 discloses a steering control apparatus employing a steer-by-wire method. This steer-by-wire steering control apparatus mechanically separates a wheel-turning mechanism (wheel-steering mechanism) from a steering wheel by means of an engagement/disengagement mechanism and drives the wheel-turning mechanism according to the steering amount. Here, the engagement/disengagement mechanism (referred to as "disengagement mechanism" also) switches the connection/disconnection between an input shaft and an output shaft and switches the transmission/non-transmission of the power.

RELATED ART DOCUMENTS

Patent Documents

[Patent Document 1] Japanese Patent Application Publication No. 2010-188930.

DISCLOSURE OF THE INVENTION

Problems to be Solved by the Invention

Taking appropriate fail-safe countermeasures are desired in vehicles employing the steer-by-wire method so that the vehicle can still be steered in case of the failure of a steer-by-wire system. For this purpose, typically proposed are the multiplexing of an electrical system and a mechanical backup system. With the multiplexing of the electrical system, the normal steering can be continued using another system even though there occurs an abnormality in a certain system. The mechanical backup system connects an operation member to the turning wheels when an electrical failure occurs, thereby allowing the wheels to be turned. Note here that in a normal state, the operation member and the turning wheels are not connected to each other.

However, there are problems to be solved in taking these countermeasures. For example, an apparatus or equipment used for the countermeasures takes a high cost, thereby often causing a large increase in cost. A space for mounting the apparatus needs to be provided as well. Such a problem concerning the fail-safe measure is a part of the reason that the steer-by-wire is not yet widely used today.

One of exemplary purposes of the present invention is to provide a steering control apparatus, suitable for the steer-by-wire method, which has a practical redundancy to achieve the fail-safe countermeasures.

Means for Solving the Problems

One embodiment of the present invention relates to a steering control apparatus of a vehicle. The apparatus includes: an input shaft; an output shaft; a clutch configured to connect or disconnect the input shaft to or from the output shaft; a turning actuator configured to rotate the output shaft; and a control unit configured to control the turning actuator. The control unit controls the turning actuator, while the clutch is disconnected, such that rotation of the output shaft is controlled within a range of rotating speeds having a lower limit. The lower limit is determined based on a rotating speed of the input shaft. The clutch is connected when a rotating speed of the output shaft is smaller than the lower limit.

According to this embodiment, the rotating speed of the output shaft of the steering control apparatus is controlled such that the rotating speed thereof exceeds the lower limit, which has been determined based on the rotating speed of the input shaft of the steering control apparatus. In a control range of rotating speeds, the rotating speed of the output shaft is optionally varied relative to the rotating speed of the input shaft. Thus, for example, a transmission ratio variable steering control can be performed. On the other hand, when the rotating speed of the output shaft falls below the lower limit of the control range thereof, the clutch located between the input shaft and the output shaft is connected, so that the rotation can be mechanically transmitted from the input shaft to the output shaft. In the event that the turning actuator, which is a source of the driving force of the output shaft, should fail to operate, the vehicle can still be steered by coupling the input shaft and the output shaft together. Hence, the steering control apparatus having a fail-safe function is provided.

The clutch may be a mechanical clutch such that, when the rotating speed of the output shaft is smaller than a rotating speed of the input shaft or when the output shaft rotates in a reverse direction of a direction of rotation of the input shaft, the clutch is connected. The lower limit may be the rotating speed of the input shaft. The control unit may control the turning actuator such that the output shaft is rotated in the same direction as that of the input shaft within the range of rotating speeds.

Used is the mechanical clutch where the connection/disconnection is switched according to rotation states of the input shaft and the output shaft. The rotation of the output shaft is controlled so that the mechanical clutch is not connected; if this state is no longer valid, the mechanical clutch will be mechanically connected. This can eliminate the electronic control of the clutch provided for the fail-safe purposes.

The mechanical clutch may include an outer wheel; an inner wheel arranged coaxially with the outer wheel; and an engagement element provided between the outer wheel and the inner wheel. The mechanical clutch may have a cam face on one of an inner surface of the outer wheel and an outer surface of the inner wheel, and the mechanical clutch may be connected when the engagement element is held between the cam face and the other of the inner surface of the outer wheel and the outer surface of the inner wheel. One of the outer wheel and the inner wheel may be formed coaxially with the input shaft on an end of the input shaft, and the other of the outer wheel and the inner wheel may be formed coaxially with the output shaft on an end of the output shaft.

This structure allows a general-purpose mechanical clutch (e.g., so-called roller-type two-way clutch) to be incorporated into the steering control apparatus.

The steering control apparatus may include a steering reaction force actuator configured to give a torque to the input shaft.

In this manner, a steering reaction torque can be given to the input shaft.

When an abnormality is detected in the steering reaction force actuator, the control unit may control the turning actuator at the beginning of steering in order to have the clutch connected.

By employing this structure and operation, when the input shaft is operated, the clutch can be promptly connected and thereby the steering reaction force can be given to the input shaft. In this manner, an insufficient steering reaction force given by the steering reaction force actuator can be supplemented. This can prevent an excessive operation of a driver, such as an unintended act of turning the steering wheel too abruptly, and therefore the operability can be improved.

When an abnormality is detected in the turning actuator, the control unit may control the steering reaction force actuator in order to assist steering.

When the turning actuator operates abnormally and does not operate as fully expected, the clutch located between the input shaft and the output shaft can be connected as described above. At this time, the steering reaction force actuator is used to assist steering. This can suppress the steering torque from increasing and therefore the operability can be improved.

The steering control apparatus may include a detector configured to detect a rotation state of the input shaft or the output shaft. The control unit may detect an abnormality of the clutch, based on a detected value of the detector and an operating state of the turning actuator.

In this manner, whether or not there is any abnormality in the clutch can be detected.

The detector may be a torque sensor provided in the input shaft. The control unit may detect the abnormality of the clutch, based on a detected value of the torque sensor when the input shaft is rotated in a non-operating state of the turning actuator.

When the input shaft is rotated while the turning actuator does not operate, the clutch gets connected, if the clutch is normal, and thereby a torque is generated. Thus, whether or not the clutch is connected normally can be detected from the detected value of the torque sensor in the input shaft.

The detector may be a rotation angle sensor provided in the output shaft. The control unit may detect the abnormality of the clutch, based on a detected value of the rotation angle sensor when the input shaft is rotated in a non-operating state of the turning actuator.

When the clutch is connected, the rotation of the input shaft causes the output shaft to rotate as well. Thus, whether or not the clutch is connected normally can be detected from the detected value of the rotation angle sensor in the output shaft.

The steering control apparatus may include a steering reaction force actuator configured to give a torque to the input shaft, and the control unit may have the steering reaction force actuator rotate the input shaft in order to detect the abnormality of the clutch.

By employing this structure and operation, the control unit has the steering reaction force actuator rotate the input shaft. Thereby, the abnormality of the clutch can be automatically detected without any operation input from the driver. This reduces an uncomfortable feeling in the driver as compared with the case where the abnormality detection processing is carried out while the driver operates the apparatus.

When the turning actuator is in a stroke end position, the control unit may detect the abnormality of the clutch.

When the turning actuator is in a stroke end, a relatively large torque may act on the clutch. Thus, whether or not an abnormal slippage occurs in the clutch when a large torque exerts on the clutch can be detected.

Another embodiment of the present invention relates also to a steering control apparatus of a vehicle. The apparatus includes: a steering unit including an input shaft; a turning unit including an output shaft; a clutch configured to connect or disconnect the input shaft to or from the output shaft; and a control unit configured to control the turning unit based on an input from the steering unit. The control unit controls rotation of the output shaft such that when the input shaft rotates, the clutch is caused to run idle.

According to this embodiment, while the clutch runs idle, the steering unit and the turning unit are isolated or disconnected from each other. Thus, a steer-by-wire control can be performed.

The clutch may be configured such that the clutch runs idle when a rotating speed of the output shaft is greater than or equal to a rotating speed of the input shaft and such that the clutch is connected when the rotating speed of the output shaft is less than the rotating speed of the input shaft.

By implementing this configuration, when the rotating speed of the output shaft drops, the clutch gets connected. Thus, the torque transmission from the steering unit to the turning unit is assured and therefore the fail-safe performance is given to the steering control apparatus.

Optional combinations of the aforementioned constituting elements, and implementations of the invention in the form of methods, apparatuses, systems, computer programs and so forth may also be practiced as additional modes of the present invention.

Effect of the Invention

The present invention provides a steering control apparatus, suitable for a steer-by-wire method, which has a practical redundancy to achieve the fail-safe countermeasures.

MODES FOR CARRYING OUT THE INVENTION

The basic idea underlying the embodiments of the present invention is that the inventor of the present invention had focused his attentions on relations between the connection/disconnection of a clutch, located in between a steering shaft and a turning shaft, and the shaft rotating speeds and then assigns a range of rotating speeds, with which the idling state of the clutch continues, to a steer-by-wire control. For example, the rotation of the turning shaft is controlled such that the clutch runs idle as a normal condition. While the clutch runs idle, the turning shaft is isolated or disconnected from the steering shaft, so that the steer-by-wire control can be performed. When, on the other hand, the rotating speed of the turning shaft drops, the clutch is connected. Then, the torque transmission from the steering shaft to the turning shaft is assured and therefore the fail-safe performance is given to a steering control apparatus.

In the steering control apparatuses proposed in the past, the clutch gets connected merely when the abnormality occurs. In such a typical configuration in the conventional practice, the idea of focusing on the relation between the connection/disconnection of the clutch and the shaft rotating speeds in the steering control is totally absent.

Figure 1:
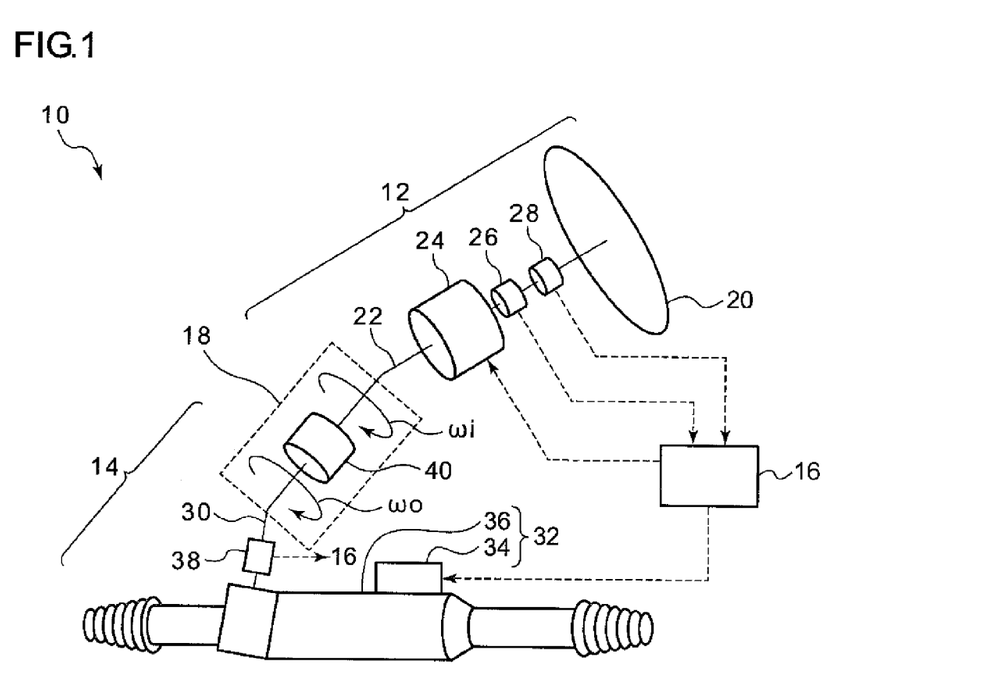
FIG. 1 schematically shows a structure of a steering control apparatus according to an embodiment of the present invention.

FIG. 1 schematically shows a structure of a steering control apparatus 10 according to an embodiment of the present invention. The steering control apparatus 10 is a steering apparatus used for a vehicle. The vehicle to which the steering control apparatus 10 applies may be a standard-size passenger car, a small-size passenger car, a small-size commuter car, or other vehicles, for instance. Or alternatively, the steering control apparatus 10 may be applied to an arbitrary vehicle having wheels (e.g., turning wheels) arranged differently from any of the aforementioned cars or having different number of wheels therefrom.

The steering control apparatus 10 converts an operation input into an electrical signal, generates a control signal from the electrical signal, and controls an actuator, which is used to steer the vehicle, by the thus generated control signal. In this manner, the vehicle is electrically steered in accordance with the operation input, without the use of mechanical coupling.

The steering control apparatus 10 includes a steering unit 12, a turning unit 14, a control unit 16, and a backup mechanism 18. The control unit 16 controls the turning unit 14 based on an input received from the steering unit 12. Under the control of the control unit 16, the steering control apparatus 10 turns wheels using the power generated by the turning unit 14, without using an operating force applied to the steering unit 12. At this time, the coupling between the steering unit 12 and the turning unit 14 by way of the backup mechanism 18 is deactivated (released).

The steering unit 12 includes an operation member, such as a steering wheel 20, which is used to receive an operation input of a driver, and an input shaft 22 rotates in response to the operation input. The steering wheel 20 is provided on one end of the input shaft 22, and the other end of the input shaft 22 is coupled to the backup mechanism 18. Since the input shaft 22 functions as a main shaft in the steering unit 12, the input shaft 22 may be called a "steering shaft".

The steering unit 12 includes a steering reaction force actuator 24. The steering reaction force actuator 24 is provided for the purpose of giving a torque to the input shaft 22. The steering reaction force actuator 24 has a reaction force motor (not shown) that is used to generate the torque. The reaction force motor may be directly coupled to the input shaft 22 or may be coupled to the input shaft 22 by way of a speed reducer, as necessary.

The steering reaction force actuator 24 is normally used to give a steering reaction torque to the steering wheel 20. The steering reaction force actuator 24 may, however, be so configured as to give a torque in a direction opposite to that of the steering reaction force torque to the steering wheel 20. And this torque in the reverse direction may be used to assist the driver to steer the vehicle.

The steering unit 12 may include a reaction force generating mechanism, which passively gives the steering reaction force to the input shaft 22, either in substitution for or together with the steering reaction force actuator 24 that actively generates the steering reaction force torque. This reaction force generating mechanism may have machine elements such as springs and dampers and may be so configured as to mechanically generate the steering reaction force.

The steering unit 12 includes a detector used to detect the operation input to the steering wheel 20 or a rotation state of the input shaft 22. More specifically, the steering unit 12 includes a steering angle sensor 26 and a steering torque sensor 28, for instance. The steering angle sensor 26 is provided for the purpose of detecting the steering angle of the steering wheel 20. The steering torque sensor 28 is provided for the purpose of detecting a rotary torque acting on the input shaft 22. These detectors of the steering unit 12 are provided on the input shaft 22, for instance.

The structures of the steering unit 12 and particularly the steering reaction force actuator 24 are not limited to the above-described ones, and suitable structures in the known art may be used as appropriate.

The turning unit 14 includes an output shaft 30 and a turning actuator 32. One end of the output shaft 30 is coupled to the backup mechanism 18, whereas the other end of the output shaft 30 is coupled to the turning actuator 32. Since the output shaft 30 functions as one of main shafts in the turning unit 14, the output shaft 30 may be called a "turning shaft". The output shaft 30 may be regarded as one of structural components constituting the turning actuator 32.

The turning actuator 32 is so configured to give a rotation to the output shaft 30. The turning actuator 32 includes, for example, a turning motor 34, which functions as a source of power, and a rack-and-pinion mechanism 36 driven by the turning motor 34. A pinion gear (not shown) of the rack-and-pinion mechanism 36 is secured to one end of the output shaft 30. And the pinion gear engages its teeth on a rack gear (not shown) of the rack-and-pinion mechanism 36. When the turning motor 34 is driven, the output shaft 30 is rotated by way of the rack-and-pinion mechanism 36. It is to be noted here that the turning motor 34 may be directly coupled to the output shaft 30 or may be coupled to the output shaft 30 by way of a speed reducer.

A rack shaft (not shown) of the rack-and-pinion mechanism 36 is coupled to right and left tie rods, and the right and left tie rods are coupled to the turning wheels by way of right and left knuckle arms, respectively, (not shown). The turning actuator 32 may include a ball screw mechanism, which is driven by the turning motor 34, in substitution for the rack-and-pinion mechanism 36.

The turning actuator 32 has a built-in regulating mechanism (not shown) that determines a turnable range of the turning wheels. The regulating mechanism is, for example, a stopper provided on a rack end of the rack-and-pinion mechanism 36 or may be any other structural component or the like as long as the similar advantageous effects as those of the stopper can be achieved. Either end of the turning actuator 32 corresponding to an extreme end of the turnable range is called a stroke end.

The turning unit 14 includes a detector for detecting a rotation state of the output shaft 30. More specifically, the turning unit 14 includes a rotation angle sensor 38 used to detect the rotation angle of the output shaft 30. The rotation angle sensor 38 is provided in the output shaft 30, for instance.

The structures of the turning unit 14 and particularly the turning actuator 32 are not limited to the above-described ones, and suitable structures in the known art may be used as appropriate.

The control unit 16 includes at least one electronic control unit (hereinafter referred to simply as "ECU"). The ECU is constituted by a computer, a driver of any one of various types of motors and various types of actuators, and so forth, for instance. The control unit 16 may include a single ECU for controlling the steering control apparatus 10. Alternatively, the control unit 16 may include a reaction-force ECU for controlling the steering reaction force actuator 24 and a turning ECU for controlling the turning actuator 32 in a separate manner.

The measurement values of the steering angle sensor 26, the steering torque sensor 28 and the rotation angle sensor 38 are inputted to the control unit 16. The control unit 16 calculates a steering reaction-force command value and a turning angle command value, based on these input values and then outputs control signals corresponding to the respective command values to the steering reaction force actuator 24 and the turning actuator 32. In this manner, the control unit 16 controls the steering reaction force actuator 24 and the turning actuator 32, respectively.

Also, the control unit 16 calculates a rotating speed of the input shaft 22 from the measurement value of the steering angle sensor 26. If necessary, the control unit 16 uses the rotating speed ci of the input shaft 22 in order to control the steering reaction force actuator 24 and/or the turning actuator 32. The rotating speed $\omega i$ of the input shaft 22 is, in most cases, equal to a steering angular velocity. Similarly, the control unit 16 calculates a rotating speed $\omega o$ of the output shaft 30 from the measurement value of the rotation angle sensor 38. If necessary, the control unit 16 uses the rotating speed on of the output shaft 30 in order to control the steering reaction force actuator 24 and/or the turning actuator 32. The rotating speed coo of the output shaft 30 is, in most cases, equal to a pinion angular velocity.

The control unit 16 may include an abnormality detecting ECU for detecting an abnormality of the steering reaction force actuator 24 and/or the turning actuator 32. Or alternatively, the aforementioned single ECU, the reaction force ECU, or the turning ECU may include a function of detecting an abnormality of the steering reaction force actuator 24 and/or the turning actuator 32. The control unit 16 determines whether or not any abnormality occurs in the steering reaction force actuator 24 and/or the turning actuator 32, by employing a suitable method in the known art.

The backup mechanism 18 includes a clutch 40 used to connect/disconnect the input shaft 22 to/from the output shaft 30. The backup mechanism 18 mainly comprises the input shaft 22, the output shaft 30 and the clutch 40. The clutch 40 as used herein is for example, a mechanical clutch that connects or disconnects the input shaft 22 and the output shaft 30 according to the rotation states of the input shaft 22 and the output shaft 30. Alternatively, the backup mechanism 18 may be an electromagnetic clutch that connects or disconnects when an electromagnet electrically conducts.

Figure 2:
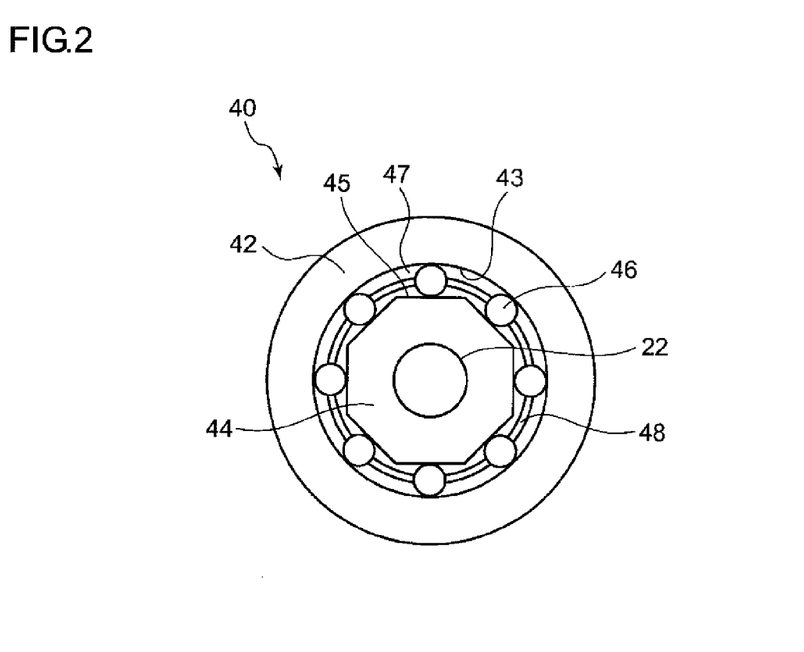
FIG. 2 shows a clutch according to an embodiment of the present invention.

FIG. 2 is a cross-sectional view schematically showing a structure of the clutch 40 of FIG. 1. The clutch 40 is a mechanical clutch comprised of an outer wheel 42, a cam 44, and a plurality of rollers 46. The clutch 40 is also called a roller-type two-way clutch. The cam 44 is an inner wheel arranged coaxially with the outer wheel 42. The roller 46 is an engagement element provided between the outer wheel 42 and the cam 44.

The outer wheel 42 is secured to one end of the output shaft 30 such that the outer wheel 42 is coaxial with the output shaft 30. FIG. 2 is a view seen from an input shaft 22 side and therefore the output shaft 30 is not depicted in FIG. 2. In FIG. 2, the output shaft 30 is mounted, for example, behind the outer wheel 42. The cam 44 is secured to one end of the input shaft 22 such that the cam 44 is coaxial with the input shaft 22.

An inner surface 43 of the outer wheel 42 is a cylindrical surface, and the cross-sectional surface of the cam 44 is a regular polygon. A cam face 45 is formed on a flat portion of the cam 44, and an outer surface of the cam 44 has a plurality of cam faces 45. A plurality of wedge-shaped spaces 47 are formed between the inner surface 43 of the outer wheel 42 and the plurality of cam faces 45. The plurality of rollers 46 are placed in the wedge-shaped spaces 47, respectively. In an embodiment as shown in FIG. 2, the cross-sectional surface of the cam 44 is a regular octagon, and eight wedge-shaped spaces 47 are uniformly formed along an outer circumference of the cam 44. Each wedge-shaped space 47 accommodates one of the rollers 46, thereby eight rollers 46 are provided in total.

The clutch 40 includes a retainer 48 for retaining the plurality of rollers 46 in the wedge-shaped spaces 47. The retainer 48 is embedded in a gap between the inner surface 43 of the outer wheel 42 and the cam faces 45 of the cam 44. The retainer 48 arranges uniformly the plurality of rollers 46 in a circumferential direction between the inner surface 43 and the cam faces 45. The retainer 48 retains the plurality of roller 46 in a rotatable manner.

The retainer 48 is so provided that the retainer 48 can rotate together with the cam 44 (i.e., the input shaft 22). The retainer 48 is configured such that when the input shaft 22 rotates, the retainer 48 has a resistance (e.g., frictional force) in a direction opposite to the rotation direction of the input shaft 22. For example, the retainer 48 may be elastically pressed against an axially adjacent member (e.g., a switching plate, not shown). The adjacent member is fixed to a static system, which is not coupled to the input shaft 22 to be rotated, and is pressed against the retainer 48 using a wavy spring, for instance. In this case, the frictional force occurring on a contact face between the retainer 48 and the adjacent member, when the retainer 48 coupled to the cam 44 rotates together with the cam 44, becomes a resistance in a reversed rotation direction.

Figure 3:
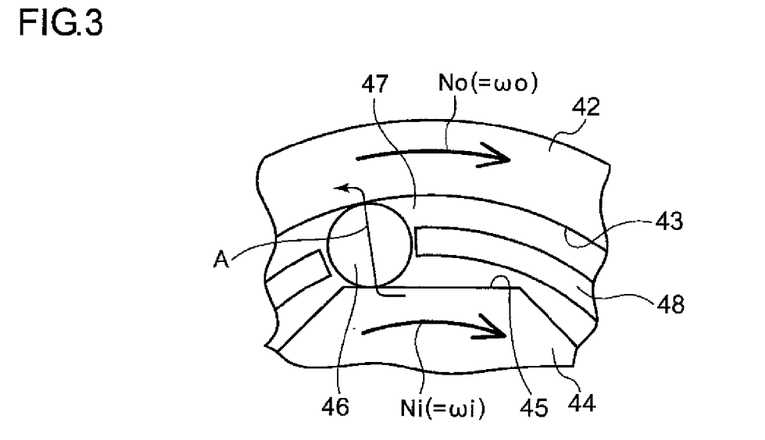
FIG. 3 is a diagram for explaining an operation of the clutch shown in FIG. 2.

As the input shaft 22 and the cam 44 rotate, the resistance acting on the retainer 48 causes a phase difference between the cam 44 and the retainer 48. In other words, the retainer 48 rotates with an angle delay relative to the cam 44. As a result, the roller 46 relatively moves from a neutral position shown in FIG. 2 toward the cam 44 in a circumferential direction. As illustrated in FIG. 3, suppose, for example, that the cam 44 rotates clockwise. Then, the roller 46 is displaced in a direction opposite to the direction of the movement of the cam 44; namely, the roller 46 is displaced leftward. In this manner, the roller 46 is held by a wedge between the inner surface 43 of the outer wheel 42 and the cam face 45. As the roller 46 is held therebetween and is thereby locked, the rotary torque is transmitted from the cam 44, namely the input shaft 22, to the outer wheel 42, namely the output shaft 30. This allows the clutch 40 to be connected, which in turn enables the steering by means of the backup mechanism 18.

When, in the actual setting, a rotating speed Ni of the cam 44 exceeds a rotating speed No of the outer wheel 42 (namely, Ni>No), the roller 46 is held by and bites in the wedge formed between the cam 44 and the outer wheel 42 and thereby the torque is transmitted from the cam 44 to the outer wheel 42. This causes the clutch 40 to be connected. However, the cam 44 and the outer wheel 42 rotate in the same direction; when the rotating speed Ni of the cam 44 falls below the rotating speed No of the outer wheel 42 (namely, Ni<No), the roller 46 disengages from a bite-in position (where the roller 46 is held by and bites in the wedge) and thereby the outer wheel 42 runs idle (namely, in an idling state). The torque is not transmitted from the cam 44 to the outer wheel 42. This causes the clutch 40 to be disconnected. The clutch 40 is configured symmetrically in forward and reverse directions. Thus, even if the cam 44 rotates in the reverse direction (e.g., counterclockwise), the clutch 40 will be connected or disconnected in the same way.

As for the connection/disconnection of the clutch 40, the similar relation holds for the rotating speeds of the input shaft 22 and the output shaft 30. In other words, when the output shaft 30 rotates in the same direction as the input shaft 22 and when the rotating speed ωo of the output shaft 30 is smaller than the rotating speed ωi of the input shaft 22 (namely when |ωi|>|ωo| and ωi are ωo are of the same sign), the clutch 40 is connected. Or, when the output shaft 30 rotates in the reverse direction of the direction of rotation of the input shaft 22 (when ωi are ωo are of the opposite sign), the clutch 40 is connected.

conversely, when the output shaft 30 rotates in the same direction as the input shaft 22 and when the rotating speed ωo of the output shaft 30 is larger than or equal to the rotating speed ωi of the input shaft 22 (namely when |ωi|≤|ωo| and ωi are ωo are of the same sign), the clutch 40 is disconnected.

For reasons of expediency, the rotation states of the input shaft 22 and the output shaft 30 connected to the clutch 40 may sometimes be called "clutch connection condition". Similarly, the rotation states of the input shaft 22 and the output shaft 30 disconnected from the clutch 40 may sometimes be called "clutch idling condition". In the present embodiment, the "clutch connection condition" is that |ωi|>|ωo| or ωi are ωo are of the opposite sign. The "clutch idling condition" is that |ωi|≤|ωo| and ωi are ωo are of the same sign.

As described earlier, the steering control apparatus 10 normally controls the turning unit 14, based on an input from the steering unit 12. The steering control apparatus 10 performs a desired steering control, which is either the steer-by-wire control or the transmission ratio variable steering control, for instance. At this time, the steering control apparatus 10 generally disconnects the clutch 40 and mechanically separates the turning unit 14 from the steering unit 12.

As described above, in the clutch 40, the cam 44 and the outer wheel 42 rotate in the same direction. And when rotating speed Ni of the cam 44 is smaller than the rotating speed No of the outer wheel 42, the outer wheel 42 runs idle. While the clutch 40 is in such an idling state as this, the outer wheel 42 can be rotated independently of the rotation of the cam 44.

In the steering control apparatus 10, the cam 44 is coupled to the input shaft 22, and the outer wheel 42 is coupled to the output shaft 30. The steering reaction force actuator 24 is provided in the input shaft 22, and the turning actuator 32 is provided in the output shaft 30. Thus, the same rotating state as when the outer wheel 42 runs idle can be created in the clutch 40 by controlling at least one of the steering reaction force actuator 24 and the turning actuator 32. In this manner, the idling state of the clutch 40 can be continued.

In the light of this, the control unit 16 according to the present embodiment controls the rotation of the output shaft 30 such that when the input shaft 22 rotates, the clutch 40 runs idle. While, in this manner, the state is kept where the steering unit 12 and the turning unit 14 are being disconnected from each other, the control unit 16 controls the steering control apparatus 10 in order to perform a desired steering control.

More specifically, the control unit 16 controls the turning actuator 32 such that the output shaft 30 rotates in the same direction as the input shaft 22 and such that the rotating speed ωo of the output shaft 30 is larger than or equal to the rotating speed ωi of the input shaft 22 (namely, |ωi|≤|ωo|. The control unit 16 controls the turning actuator 32 such that the clutch 40 is constantly in an idling state, as long as it is permitted to perform the steering control (for example, as long as the steering control apparatus 10 operates normally).

By employing this structure and method, the clutch 40 is disconnected when a desired steering control is to be performed, and therefore a so-called steer-by-wire function can be maintained. While the state is kept where the clutch 40 is being disconnected, the rotating speed ωo of the output shaft 30 can be optionally adjusted within a range of rotating speeds where the rotating speed ωi of the input shaft 22 is the lower limit. A desired transmission ratio variable steering control can be performed by varying the rotating speed ωo of the output shaft 30 relative to the rotating speed ωi of the input shaft 22.

If, on the other hand, the rotating speed ωo of the output shaft 30 drops below the rotating speed ωi of the input shaft 22 for some reason, the turning angle of a wheel may possibly be insufficient for an operation input of the driver to be carried out. Nevertheless, in the steering control apparatus 10, the clutch 40 is connected and the activation of the backup mechanism 18 is assured when the rotating speed ωo of the output shaft 30 is smaller than the rotating speed ωi of the input shaft 22. Hence, the steering control apparatus 10 having a fail-safe function is provided.

Figure 4:
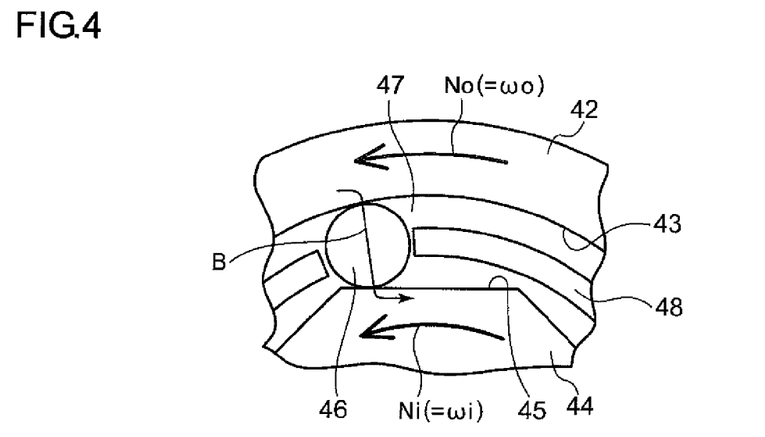
FIG. 4 is a diagram for explaining an operation of the clutch shown in FIG. 2.
Figure 5:
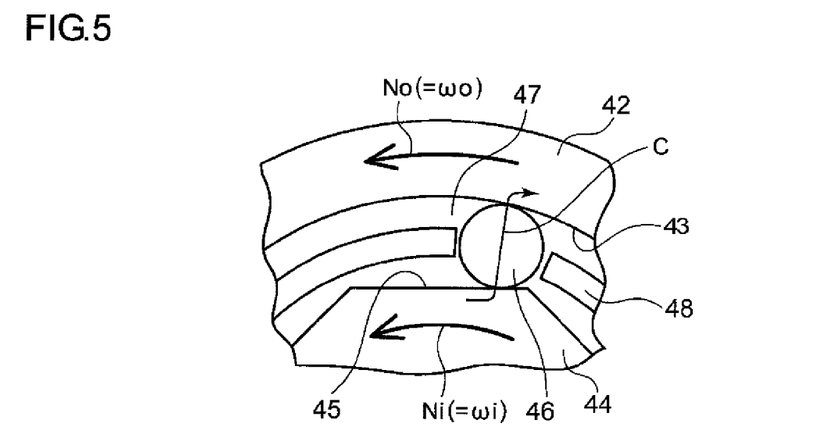
FIG. 5 is a diagram for explaining an operation of the clutch shown in FIG. 2.

It is anticipated, for example, that the output shaft 30 will not be rotated due to an abnormality occurring in the turning actuator 32. FIG. 3 to FIG. 5 are each a diagram for explaining an operation of the clutch 40 in the event that an abnormality occurs in the turning actuator 32. Each of FIG. 3 to FIG. 5 illustrates an enlarged view of a portion of the clutch 40. FIG. 3 shows a case when the steering wheel 20 is increasingly turned in the right direction. Contrary to FIG. 3, FIG. 4 and FIG. 5 each shows a case when the steering wheel 20 is returned from the right turning of the steering wheel 20 to the original neutral position thereof. FIG. 4 shows a case of a large self-aligning torque, and FIG. 5 shows a case of a small self-aligning torque.

As the steering wheel 20 is increasingly turned, the input shaft 22 rotates. At this time when the clutch 40 is disengaged, the output shaft 30 will not be rotated if the turning actuator 32 does not operate. In this case, the rotating speed ωo of the output shaft 30 is apparently smaller than the rotating speed ωi of the input shaft 22, and therefore the clutch connection condition is met. Thus, as shown in FIG. 3, the rollers 46 are locked as a result of a wedge effect in the clutch 40, and the torque is transmitted from the cam 44 to the outer wheel 42. The flow of this torque is illustrated using arrow A. In this manner, the clutch 40 is connected and the output shaft 30 is rotated at a rotating speed equal to that of the input shaft 22. As a result, the wheels are turned according to an amount of the steering by the increasingly turned steering wheel 20.

When the steering wheel 20 is returned thereto, the steering direction is reversed. However, the clutch 40 has already been connected at the time the steering wheel 20 is increasingly turned. As shown in FIG. 4, the self-aligning torque, which is sufficiently large, is so applied as to have the clutch 40 connected. The locked state of the rollers 46 by the wedge effect continues and the torque is transmitted from the outer wheel 42 to the cam 44. The flow of this torque is illustrated using arrow B. In this manner, a connection state where the clutch 40 is connected continues even when the steering direction is reversed, and the input shaft 22 is rotated at a rotating speed equal to that of the output shaft 30. As a result, the steering wheel 20 is returned thereto.

As shown in FIG. 5, if the self-aligning torque is small and if the steering wheel 20 is to be returned thereto, for example, during stationary steering, the connection state of the clutch 40 will be once terminated. The outer wheel 42 comes to rest, the cam 44 is rotated by returning the steering wheel 20 thereto, and thereby the roller 46 is moved to a position on a side opposite to the side shown in FIG. 3. When, in this state, the roller 46 comes in contact with the outer wheel 42, the rotating speed ωo of the output shaft 30 at rest is apparently smaller than the rotating speed ωi of the input shaft 22 and the clutch connection condition is again met. The rollers 46 are locked as a result of the wedge effect, and the torque is transmitted from the cam 44 to the outer wheel 42. The flow of this torque is illustrated using arrow C. In this manner, the clutch 40 is connected and the output shaft 30 is rotated at a rotating speed equal to that of the input shaft 22. As a result, the wheels are turned according to an amount of the return steering by the steering wheel 20.

In the steering control apparatus 10, as described above, even though the turning actuator 32 does not operate, the clutch 40 is mechanically connected, so that the vehicle can be steered. Since the fail-safe function in the steer-by-wire function can be realized using the mechanical means, the steering control apparatus 10 does not require an electronically-controlled redundant system. Also, an actuator by which to switch the connection/disconnection of the clutch 40 is not required. A mechanical configuration is generally more reliable than the electrically controlled system. Further, a reliable fail-safe function is achieved at low cost, so that a steer-by-wire apparatus excellent in practicality can be provided.

Also, a steering gear ratio when the clutch 40 is being connected is larger than that in the normal operation. This is because, during the normal operation, control is performed such that the rotating speed $\omega o$ of the turning shaft exceeds the rotating speed $\omega i$ of the steering shaft but, during the connection state of the clutch, the rotating speeds $\omega o$ and $\omega i$ of the both shafts are equal to each other. This is advantageous in that an increase in the gear ratio after the clutch 40 has been connected mitigates an increase in the steering force resulting from the stoppage of the turning actuator 32.

Figure 6:
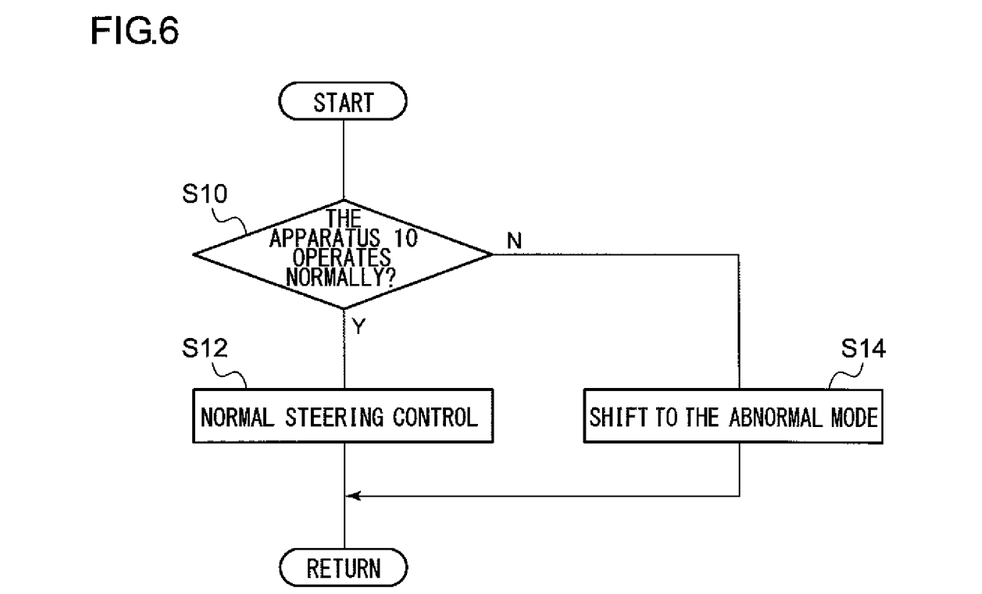
FIG. 6 is a flowchart for explaining a steering control according to an embodiment of the present invention.

FIG. 6 is a flowchart for explaining a steering control according to an embodiment of the present invention. The control unit 16 performs the steering control in a predetermined control cycle, for instance. As the processing starts, the control unit 16 determines whether or not there is any abnormality occurring in the steering control apparatus 10 or references the most recent determination result (S10). The control unit 16 determines whether or not, for example, any abnormality occurs in the steering reaction force actuator 24 and/or the turning actuator 32, by employing a suitable method in the known art. Or alternatively, the control unit 16 determines whether any abnormality occurs in the clutch 40, by employing a method described later, for instance.

If it is determined that the steering control apparatus 10 operates normally (Y of S10), the control unit 16 will perform a normal steering control (S12). This normal mode is a transmission ratio variable control, for example, and is similar to the existing steer-by-wire control excepting that the rotation of the output shaft 30 is controlled in such a manner as to meet the above-described clutch idling condition.

If it is determined that a certain abnormality has occurred in the steering control apparatus 10 (N of S10), the control unit 16 will shift its mode to an abnormal mode (S14). At this time, the clutch 40 is mechanically connected. Together with or in substitution of this, the control unit 16 may control the rotation of the output shaft 30 and/or the input shaft 22, in the abnormal mode, in such a manner as to meet the above-described clutch connection condition. In this manner, the connection of the clutch 40 may be assured.

When an abnormality is detected in the turning actuator 32, the control unit 16 may control the steering reaction force actuator 24 in order to assist steering. The control unit 16 may control the steering reaction force actuator 24 so as to switch the torque from that in a steering reaction force direction to that in a power-assist direction, which is a direction opposite to the steering reaction force direction. This allows at least part of power assist by the turning actuator 32 to be substituted by the steering reaction force actuator 24. Thus, the deterioration in operability on account of the abnormality occurring in the turning actuator 32 can be alleviated.

When an abnormality is detected in the steering reaction force actuator 24, the control unit 16 may control the turning actuator 32 at the beginning of steering in order to have the clutch 40 connected. The control unit 16 detects whether or not the clutch 40 is connected, based on a detected value of the steering torque sensor 28, for instance. If the connection of the clutch is verified, the control unit 16 controls the turning actuator 32 in order to generate the steering reaction force. This allows at least part of generating the steering reaction force by the steering reaction force actuator 24 to be substituted by the turning actuator 32. Thus, the deterioration in operability on account of the abnormality occurring in the steering reaction force actuator 24 can be alleviated.

In this case, for example, the control unit 16 may limit the operation of the turning actuator 32 if the steering angle is smaller than a threshold value. This allows "$|\omega i|>|\omega o|$" in the clutch connection condition to be satisfied, thereby connecting the clutch 40. When the steering angle is smaller than the threshold, the control unit 16 may have the turning actuator 32 operate in a direction opposite to the normal direction. This allows "$\omega i$ are $\omega o$ are of the opposite sign" in the clutch connection condition to be satisfied, thereby connecting the clutch 40. The threshold value for the steering angle may be set to a value associated with a backlash of the roller 46 created when the roller 46 bites in the wedge, for instance.

Figure 7:
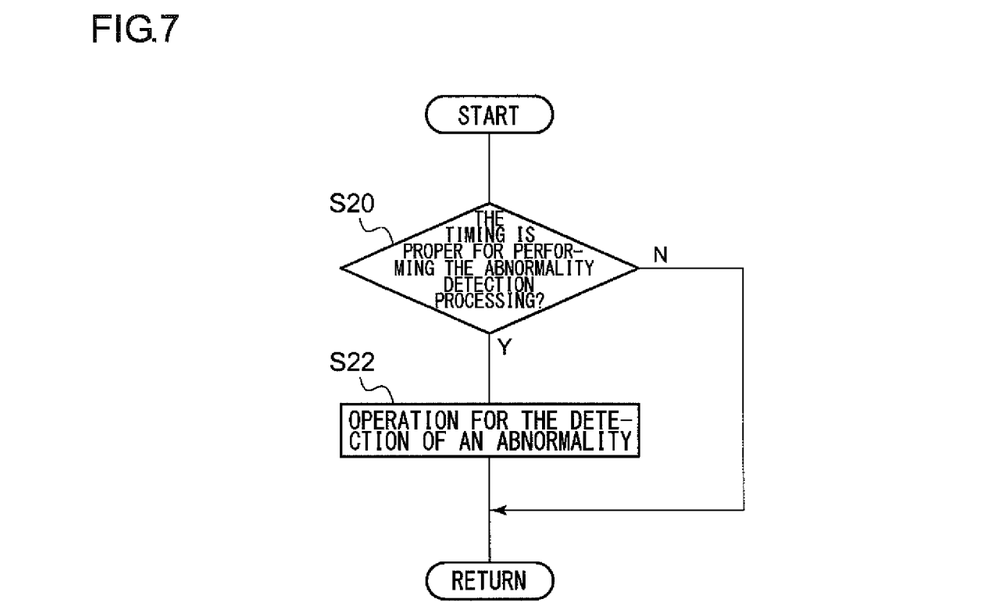
FIG. 7 is a flowchart for explaining a process for detecting an abnormality of a clutch according to an embodiment of the present invention.

A description is now given of an exemplary method for detecting an abnormality of the clutch 40. FIG. 7 is a flowchart for explaining a process for detecting an abnormality of the clutch according to an embodiment of the present invention. The control unit 16 performs the abnormality detection processing in a predetermined control cycle, for instance. As the processing starts, the control unit 16 determines if the timing is proper for performing the abnormality detection processing (S20). The abnormality detection processing is performed under circumstances, which allows the processing to be performed, such as while a vehicle is stopped (more specifically, when the vehicle is parked or not moving, for instance). The control unit 16 determines if the abnormality detection processing is to be activated with a predetermined timing in the situations allowing the processing to be performed.

If it is determined that the timing is proper for performing the abnormality detection processing (Y of S20), the control unit 16 will perform an operation for the detection of the abnormality (S22). If, on the other hand, it is determined that the timing is not proper for performing the abnormality detection processing (N of S20), the control unit 16 will not perform the operation for the detection of the abnormality.

This operation of detecting the abnormality (S22) includes executing the actuator operation for the detection of the abnormality, detecting the rotation state of the input shaft 22 or the output shaft 30 during the actuator operation, and determining whether or not there is any abnormality occurring in the clutch 40, based on the detected rotation state and the operating state of the actuator. The actuator operation for the detection of the abnormality includes having at least one of the steering reaction force actuator 24 and the turning actuator 32 operated. The rotation state of the input shaft 22 or the output shaft 30 is detected by at least one of the steering angle sensor 26, the steering torque sensor 28 and the rotation angle sensor 38.

Some specific examples of processes for detecting the abnormality are described as follows. In one example, immediately after an ignition is turned on and when the driver operates on the steering wheel 20, the control unit 16 determines the timing is proper for performing the abnormality detection processing. Whether or not there is any operation input from the driver is detected by the steering angle sensor 26. At this time, the control unit 16 temporarily inhibits the operation of the turning actuator 32, in order to detect any abnormality. The control unit 16 detects the abnormality of the clutch 40, based on a detected value of the steering torque sensor 28 when the steering wheel 20 is operated in a non-operating state of the turning actuator 32.

If the detected value of the steering torque sensor 28 exceeds the threshold value, the control unit 16 will determine that the clutch 40 operates normally. If it is determined that the clutch 40 operates normally, the control unit 16 will terminate the process for detecting the abnormality and then return to the normal steering control. If, on the other hand, the detected value of the steering torque sensor 28 does not exceed the threshold value before the steering angle reaches a predetermined value, the control unit 16 will determine that there is an abnormality occurring in the clutch 40.

While the input shaft 22 is rotated through an operation input by the driver, the output shaft 30 is not rotated because of the non-operating state of the turning actuator 32. As a result, the clutch connection condition is met. If the clutch 40 operates normally, the clutch 40 will be connected and a torque will act on the input shaft 22. If the clutch 40 is connected normally, the detected value of the steering torque sensor 28 provided in the input shaft 22 will increase. A determining threshold value for the detected values of the steering torque sensor 28 is set based on such an amount of increase in the torque. Also, the predetermined value of the steering angle with which to terminate the process for detecting the abnormality is set in consideration of the effect of the predetermined value thereof on the normal steering control.

In this manner, whether or not the clutch 40 is connected normally can be detected from the detected value of the steering torque sensor 28 provided in the input shaft 22. Since the process for detecting the abnormality is carried out immediately after the ignition is turned on and when the driver operates on the steering wheel 20, the abnormality, if any, can be detected without fail every time the vehicle is used.

The rotation angle sensor 38 may be used in substitution for the steering torque sensor 28. In other words, the control unit 16 may detect the abnormality of the clutch 40, based on a detected value of the rotation angle sensor 38 when the steering wheel 20 is operated in a non-operating state of the turning actuator 32. This is because if the clutch 40 operates normally, the clutch 40 is connected and the output shaft 30 rotates together with the input shaft 22. In this manner, whether or not the clutch 40 is connected normally can be detected from the detected value of the rotation angle sensor 38 in the output shaft 30.

The steering reaction force actuator 24 may be used instead of using an operation input from the driver as the driving force of the input shaft 22. In other words, in order to detect any abnormality of the clutch 40, the control unit 16 may temporarily inhibit the operation of the turning actuator 32 and simultaneously have the steering reaction force actuator 24 rotate the input shaft 22. With this structure and method, the abnormality of the clutch 40 can be automatically detected without any operation input from the driver. This reduces an uncomfortable feeling as experienced by the driver, as compared with the case where the abnormality detection processing is carried out while the driver operates on the steering wheel 20.

When the steering reaction force actuator 24 is to be activated in order to detect any abnormality of the clutch 40, the timing with which the abnormality detection processing is performed is not limited to immediately after the turning-on of the ignition. The control unit 16 may determine that, for example, immediately after the turning-off of the ignition, the instant the driver gets out of his/her vehicle or when no one is in the vehicle, or when a door key of the vehicle is unlocked are the timings with which the abnormality detection processing is to be performed. At each of these instants of time, the driver does not touch the steering wheel 20. Thus the clutch 40 can undergo the abnormality detection processing without giving a sense of discomfort to the driver.

In another example of the process for detecting the abnormality, the control unit 16 may perform the abnormality detection processing when the turning actuator 32 is in a stroke end position. The control unit 16 may temporarily limit the operation of the steering reaction force actuator 24 for the purpose of detecting the abnormality. The control unit 16 detects the abnormality of the clutch 40, based on a detected value of the steering angle sensor 26.

If the detected value of the steering angle sensor 26 does not exceed a threshold value before a predetermined length of determination time has elapsed, the control unit 16 will determine that the clutch 40 operates normally. If it is determined that the clutch 40 operates normally, the control unit 16 will terminate the abnormality detection processing and then return to the normal steering control. If, on the other hand, the detected value of the steering angle sensor 26 exceeds the threshold value, the control unit 16 will determine that there is an abnormality occurring in the clutch 40.

For example, when the stationary steering or the like is made in parking the vehicle inside a garage or at a parking spot, the rack of the turning actuator 32 abuts against a rack end and thereby the rotation of the output shaft 30 is physically restricted. In the normal steering control, the steering reaction force actuator 24 under the stationary steering opposes an operation by the driver and therefore a relatively large steering reaction force is applied to the input shaft 22. As the steering reaction force actuator 24 is stopped, the input shaft 22 is rotated by an operation on the steering wheel 20 by the driver and then the clutch connection condition is met. If the clutch 40 operates normally, the clutch 40 will be connected and the input shaft 22 will not be rotated any further. The detected value of the steering angle sensor 26 is then a fixed value. If, however, slippage occurs in the clutch 40, the input shaft 22 will continue to rotate with the result that the detected value of the steering angle sensor 26 increases. The determining threshold value for the detected values of the steering angle sensor 26 is set based on such an amount of increase in the turning angle. Also, the length of determination time with which to terminate the abnormality detection processing is set in consideration of the effect of the length of determination time on the normal steering control.

In this manner, whether or not an abnormal slippage occurs in the clutch 40 when such a relatively large torque exerts on the clutch 40 can be detected.

Instead of stopping the steering reaction force actuator 24, the control unit 16 may control the steering reaction force actuator 24 such that the steering reaction force is weaken than normal. Also, the control unit 16 may control the steering reaction force actuator 24 in such a direction as to increasingly turn the steering wheel 20. In this manner, too, whether or not an abnormal slippage occurs in the clutch 40 when such a relatively large torque exerts on the clutch 40 can be detected as well.

The steering torque sensor 28 may be used in substitution for the steering angle sensor 26. If an abnormal slippage occurs in the clutch 40, the detected value of the steering torque sensor 28 will be lower than normal. In the light of this, if the detected value of the steering torque sensor 28 does not fall below a threshold value before a predetermined length of determination time has elapsed, the control unit 16 may determine that the clutch 40 operates normally. If, on the other hand, the detected value of the steering torque sensor 28 falls below the threshold value, the control unit 16 may determine that there is an abnormality occurring in the clutch 40.

In still another example of the process for detecting the abnormality, the control unit 16 may perform the abnormality detection processing immediately after the turning-on of the ignition, for example, or preferably before the locked state of the steering wheel 20 is released. In order to detect the abnormality, the control unit 16 has the turning actuator 32 operated so as to turn the wheels. The control unit 16 detects the abnormality of the clutch 40, based on a detected value of the steering torque sensor 28.

If the clutch 40 is being disengaged normally, the activation of the turning actuator 32 will not transmit the movement to the input shaft 22. Thus, whether or not the clutch 40 is being disengaged normally can be detected based on the activation of the turning actuator 32 and the detected value of the steering torque sensor 28. The abnormality of the clutch 40 can be reliably detected before the vehicle starts moving.

For a compact commuter vehicle, its wheel base is short and therefore the yaw gain relative to the turning angle is large. Accordingly, the gear ratio of a steering system is set larger than in a larger-sized vehicle; this is preferred in terms of suppressing the wobbling of a vehicle body during a high-speed running. On the other hand, the gear ratio is desirably set to a small value in order that the vehicle can easily move about with less trouble in city streets. Thus, in order to achieve both the safety during a high-speed running and the easy-to-use nature in city streets, it is preferable that the gear ratio for the compact commuter vehicle be variable by use of the steer-by-wire system.

Since the compact commuter vehicle is smaller in size, it is subject to severer restrictions, in terms of both the installation space and the cost for the mounted devices and components, than in the large-sized vehicle. Thus, the already-proposed fail-safe methods, characterized by the mechanical backup system with the electronic control of the clutch and the multiplexing of the electric system, are not necessarily realistic. Also, such the electronic control increases the electric power consumed by the vehicle, which may cause an adverse effect on the fuel efficiency.

Thus, the steering control apparatus 10 according to the present embodiments is particularly suitable for compact commuter vehicles in terms of the fact that the fail-safe function has been mechanically assured using a compact structure. At the same time, such advantages as high reliability, low cost, space-saving and low-power consumption are desired not only for the compact commuter vehicle but also for all types of vehicles. In this sense, the embodiments of the present invention and their modifications represent a promising technology of a breakthrough level that will result in a wide use of the steer-by-wire system.

The present invention has been described by referring to the embodiments and such description is for illustrative purposes only. It is understood by those skilled in the art that any arbitrary combinations of the constituting elements and processes could be developed as modifications and that such modifications are also within the scope of the present invention. A description will be given hereunder of such modifications.

The clutch 40 used in the embodiments of the present invention is merely exemplary, and a clutch having another structure may be used. For example, the cam face may be provided on the inner surface of the outer wheel instead of the structure where the cam face is provided on the outer surface of the inner wheel. Or alternatively, the outer wheel may be formed on an end of the input shaft, and the inner wheel may be formed on an end of the output shaft. The engagement element between the outer wheel and the inner wheel may be a sprag.

The clutch 40 may include an electromagnetic clutch. The control unit 16 may disconnect the electromagnetic clutch when the rotating speed ωo of the output shaft exceeds a preset lower limit, and may connect the electromagnetic clutch when the rotating speed ωo of the output shaft falls below the preset lower limit. In this case, it suffices that the electromagnetic clutch is connected when the rotating speed ωo of the output shaft drops to a degree to which the activation of the backup mechanism 18 is desired. As a result, the lower limit of the rotating speed ωo of the output shaft set based on the rotating speed ωi of the input shaft does not need to be equal to the rotating speed GA of the input shaft. And the lower limit of the rotating speed ωo of the output shaft may be set to a value near the rotating speed ωi of the input shaft.

INDUSTRIAL APPLICABILITY

The present invention provides a steering control apparatus having a practical redundancy to achieve the fail-safe countermeasures.

DESCRIPTION OF THE REFERENCE NUMERALS

10 Steering control apparatus
12 Steering unit
14 Turning unit
16 Control unit
18 Backup mechanism
20 Steering wheel
22 Input shaft
24 Steering reaction force actuator
26 Steering angle sensor
28 Steering torque sensor
30 Output shaft
32 Turning actuator
34 Turning motor
36 Rack-and-pinion mechanism
38 Rotation angle sensor
40 Clutch
42 Outer wheel
43 Inner surface
44 Cam
45 Cam face
46 Roller
47 Wedge-shaped space
48 Retainer

What is claimed is:

1. A steering control apparatus of a vehicle comprising:
an input shaft;
an output shaft;
a clutch configured to connect or disconnect the input shaft to or from the output shaft;
a turning actuator configured to rotate the output shaft; and
a control unit configured to control the turning actuator,
wherein the control unit controls the turning actuator, while the clutch is disconnected, such that rotation of the output shaft is controlled within a range of rotating speeds having a lower limit, wherein the lower limit is determined based on a rotating speed of the input shaft, and wherein the clutch is connected when a rotating speed of the output shaft is smaller than the lower limit.

2. The steering control apparatus according to claim 1, wherein the clutch is a mechanical clutch such that, when the rotating speed of the output shaft is smaller than a rotating speed of the input shaft or when the output shaft rotates in a reverse direction of a direction of rotation of the input shaft, the clutch is connected, wherein the lower limit is the rotating speed of the input shaft, and wherein the control unit controls the turning actuator such that the output shaft is rotated in the same direction as that of the input shaft within the range of rotating speeds.

3. The steering control apparatus according to claim 2, the mechanical clutch comprising:

an outer wheel;

an inner wheel arranged coaxially with the outer wheel; and an engagement element provided between the outer wheel and the inner wheel, wherein the mechanical clutch has a cam face on one of an inner surface of the outer wheel and an outer surface of the inner wheel, and the mechanical clutch is connected when the engagement element is held between the cam face and the other of the inner surface of the outer wheel and the outer surface of the inner wheel, wherein one of the outer wheel and the inner wheel is formed coaxially with the input shaft on an end of the input shaft, and the other of the outer wheel and the inner wheel is formed coaxially with the output shaft on an end of the output shaft.

4. The steering control apparatus according to claim 1, further comprising a steering reaction force actuator configured to give a torque to the input shaft.

5. The steering control apparatus according to claim 4, wherein, when an abnormality is detected in the steering reaction force actuator, the control unit controls the turning actuator at the beginning of steering in order to have the clutch connected.

6. The steering control apparatus according to claim 4, wherein, when an abnormality is detected in the turning actuator, the control unit controls the steering reaction force actuator in order to assist steering.

7. The steering control apparatus according to claim 1, further comprising a detector configured to detect a rotation state of the input shaft or the output shaft, wherein the control unit detects an abnormality of the clutch, based on a detected value of the detector and an operating state of the turning actuator.

8. The steering control apparatus according to claim 7, wherein the detector is a torque sensor provided in the input shaft, and the control unit detects the abnormality of the clutch, based on a detected value of the torque sensor when the input shaft is rotated in a non-operating state of the turning actuator.

9. The steering control apparatus according to claim 7, wherein the detector is a rotation angle sensor provided in the output shaft, and the control unit detects the abnormality of the clutch, based on a detected value of the rotation angle sensor when the input shaft is rotated in a non-operating state of the turning actuator.

10. The steering control apparatus according to claim 9, further comprising a steering reaction force actuator configured to give a torque to the input shaft, wherein the control unit has the steering reaction force actuator rotate the input shaft in order to detect the abnormality of the clutch.

11. The steering control apparatus according to claim 7, wherein, when the turning actuator is in a stroke end position, the control unit detects the abnormality of the clutch.

12. A steering control apparatus of a vehicle comprising:

a steering unit comprising an input shaft;

a turning unit comprising an output shaft;

a clutch configured to connect or disconnect the input shaft to or from the output shaft; and a control unit configured to control the turning unit based on an input from the steering unit, wherein the control unit controls rotation of the output shaft such that when the input shaft rotates, the clutch is caused to run idle.

13. The steering control apparatus according to claim 12, wherein the clutch is configured such that the clutch runs idle when a rotating speed of the output shaft is greater than or equal to a rotating speed of the input shaft and such that the clutch is connected when the rotating speed of the output shaft is less than the rotating speed of the input shaft.

* * * * *